United States Patent [19]

Ishikawa

[11] 3,945,345

[45] Mar. 23, 1976

[54] ROTARY INTERNAL COMBUSTION ENGINE AND A METHOD OF OPERATING THE SAME

[75] Inventor: Yoshikazu Ishikawa, Chofu, Japan

[73] Assignee: Nissan Motor Company Limited, Yokohama, Japan

[22] Filed: Apr. 17, 1974

[21] Appl. No.: 461,802

[30] Foreign Application Priority Data

Apr. 17, 1973 Japan.............................. 48-42664

[52] U.S. Cl. .............. 123/8.05; 123/8.13; 123/8.45
[51] Int. Cl.² ........................................... F02B 53/06
[58] Field of Search.................. 123/8.05, 8.13, 8.45

[56] References Cited
UNITED STATES PATENTS

| | | | |
|---|---|---|---|
| 3,097,632 | 7/1963 | Froede | 123/8.05 |
| 3,310,042 | 3/1967 | Haas | 123/8.05 |
| 3,358,439 | 12/1967 | De Castelet | 123/8.05 X |
| 3,491,729 | 1/1970 | Lamm | 123/8.13 |
| 3,688,749 | 9/1972 | Wankel | 123/8.05 X |

*Primary Examiner*—Clarence R. Gordon

[57] ABSTRACT

A seven-phase rotary internal combustion engine for carrying out intake, compression-ignition, power or primary expansion, transfer, scavenging, afterburning or secondary expansion, and exhaust phases, has an intake port, a second intake or scavenging air intake port, an exhaust port and a transfer passage.

2 Claims, 15 Drawing Figures

3,945,345

ROTARY INTERNAL COMBUSTION ENGINE AND A METHOD OF OPERATING THE SAME

The present invention relates to internal combustion engines and to method of operating the same in a working cycle which includes the four phases of intake, compression, expansion and exhaust. More particularly, the present invention relates to a rotary internal combustion engine having at least a pair of bodies or members mounted, one within the other, for relative motion to provide variable volume working chambers, and to method of operating such an engine in a working cycle which includes the four phases above-mentioned.

Such a rotary internal combustion engine comprises an outer body having a cavity therein and an inner body disposed within the cavity, the inner body being rotatable relative to the outer body about an axis spaced from but parallel to the axis of the cavity. The outer body has axially spaced end walls and a peripheral wall interconnecting the end walls to form the cavity, the inner surface of the peripheral wall having a multi-lobed profile which preferably is basically an epitrochoid. The inner body has end faces disposed adjacent to the outer body end walls for sealing cooperation therewith, and has a peripheral surface with a profile having a plurality of circumferentially spaced apex portions, each such apex portion bearing a radially movable seal element for sealing engagement with the inner surface of the peripheral wall to form a plurality of working chambers which vary in volume on relative rotation of the two bodies. Each such apex seal extends in an axial direction from one end face to the other of the inner body. The number of apexes will usually exceed the number of lobes of the epitrochoid by one. It is well recognized that, in such engines, combustible charge disposed within an area at the trailing corner portion is difficult to ignite or burn, and thus hydrocarbons and carbon monoxide concentrations in exhaust gases from such engines are relatively high.

The present invention is directed especially to a novel rotary internal combustion engine having relatively rotatable bodies providing a number of variable volume working chambers and to a novel method of working such an engine in a seven-phase cycle which includes the four phases of intake, compression, expansion and exhaust. The novel engine enables a two-stage expansion of combustion medium in one operational cycle.

An object of the present invention is to provide a new and improved rotary internal combustion of the nature aforesaid, and method of operation thereof, in and by which each of the variable volume working chambers operates on a seven-phase operational cycle which includes the four phases of intake, compression, power or expansion and exhaust.

Another object of the present invention is to provide a new and improved rotary internal combustion engine of the nature aforesaid, and method of operation thereof, in and by which each of the variable volume working chambers, operates on a seven-phase operational cycle which includes a two-stage expansion of combustion medium.

A further object of the present invention is to provide a new and improved rotary internal combustion engine of the nature aforesaid, and method of operation thereof, in and by which each of the variable volume working chambers operates on a seven-phase operational cycle which includes, in addition to the four phases of intake, compression, power or expansion and exhaust, an afterburning or secondary expansion phase.

Another object of the present invention is to provide a rotary internal combustion engine of the nature aforesaid, having four variable volume working chambers and having two intake ports for supplying separate charges of combustion medium to each of said chambers at separate phases in operational cycle of each chamber, and to provide a method of operating such an engine by which each of the four chambers operates on a seven-phase cycle which includes in addition to four phases of intake, compression, power or expansion and exhaust, three phases of transfer, scavenging, and afterburning or secondary expansion.

The phases of operation of the cycle, as carried out in sequence in any given one of the variable volume working chambers in accordance with the method of the present invention, are as follows.

First phase: An intake phase in which a charge of a fuel-air mixture is sucked or drawn into a given chamber.

Second phase: A compression-ignition phase in which the charge of fuel-air mixture in the chamber is compressed and thereafter ignited.

Third phase: A power or expansion phase in which work is done by expansion of the ignited charge in the given chamber.

Fourth phase: A transfer phase in which a portion of burnt gas in the given chamber is transferred to the next preceding chamber.

Fifth phase: A scavenging phase in which scavenging air is supercharged to the given chamber to scavenge a remainder of burnt gas in the given chamber to the next preceding chamber from the given chamber.

Sixth phase: An afterburning or secondary expansion phase in which burnt gas is transferred, for mixture with the scavenging air in the given chamber, to the given chamber from the next following chamber.

Seventh phase: An exhaust phase in which exhaust or removal of the combustion product from the given chamber takes place.

It will be understood that the same seven phase cycle is carried out in each of the variable volume working chambers, in turn.

One type of novel rotary engine which may be used for carrying out a working cycle composed of the aforementioned seven phases generally comprises an outer body or member having axially spaced end walls and a peripheral wall interconnecting the end walls and including three symmetrically arranged, circumferentially spaced lobe-defining portions on its inner surface, and an inner member. The outer member has its peripheral surface provided with arched lobe-defining portions, the surface being shaped as, preferably, a three-lobed epitrochoid. The inner member is generally a four sided figure which has, generally, the form of a square. Either the outer member or the inner member may be made the stationary member with the other member made the rotary member, or both members may be rotary members so long as there is relative rotation of one member with respect to the other.

The outer surface of the inner member and the inner surface of the outer member are related to each other to define four variable volume working chambers with the inner member having its geometrical center displaced from the geometrical center of the outer member and rotatable thereabout thereby varying the volume of the four variable volume working chambers. An intake port is provided in the outer member shortly after or beyond a point at a minimum distance from the geometrical center thereof with respect to the direction of rotation of the inner member relative to the outer member, and an exhaust port is provided shortly before said point at a minimum distance from the center of the outer member in the aforesaid direction, the intake port being provided for the insertion of a fuel-air mixture and the exhaust port being provided for the removal of burnt gas. A transfer passage is provided in the outer member to provide for the transfer of burning gas from a given working chamber to the next preceding chamber in the direction of rotation of the inner member, the transfer passage being positioned in the vicinity of the third point at a minimum distance from the geometrical center of the outer member. A scavenging air intake port is provided in the outer member and located so as to deliver a scavenging air directly into a given working chamber to scavenge or transfer burnt gas therein to the next preceding chamber.

The objects, advantages and nature of the present invention will be more fully understood from the following description of preferred embodiments of the present invention, shown by way of example, in the accompanying drawings, in which.

Figure 1A:
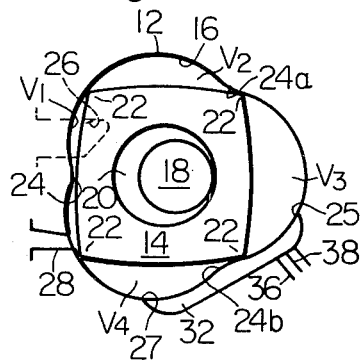
FIGS. 1A–1L are a series of diagrammatic views illustrating, successively, the angular relationship of two relatively rotatable members of a rotary internal combustion engine illustrated in FIG. 2.
Figure 1B:
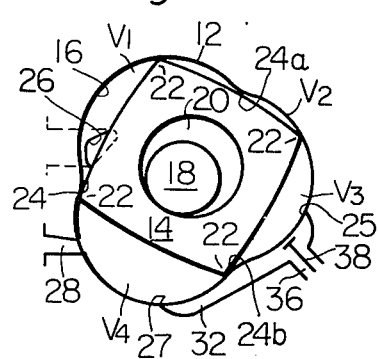

Referring now more particularly to the accompanying drawings, FIGS. 1A–1L illustrate the phase relationships or operation steps of an outer member 12 and an inner member or rotor 14 with respect thereto in an engine according to the present invention and demonstrating the presently preferred mode of practicing the method of the present invention. In the following description, outer member 12 is indicated as the stationary member and may be referred to as such and the inner member or body 14 is indicated as the rotary member and may be referred to as such to simplify the explanation of the method of operation. However it is to be understood that it is within the scope of the present invention to make member 12 the rotary member and member 14 the stationary member, or merely to provide a relative angular velocity between members 12 and 14.

Figure 2:
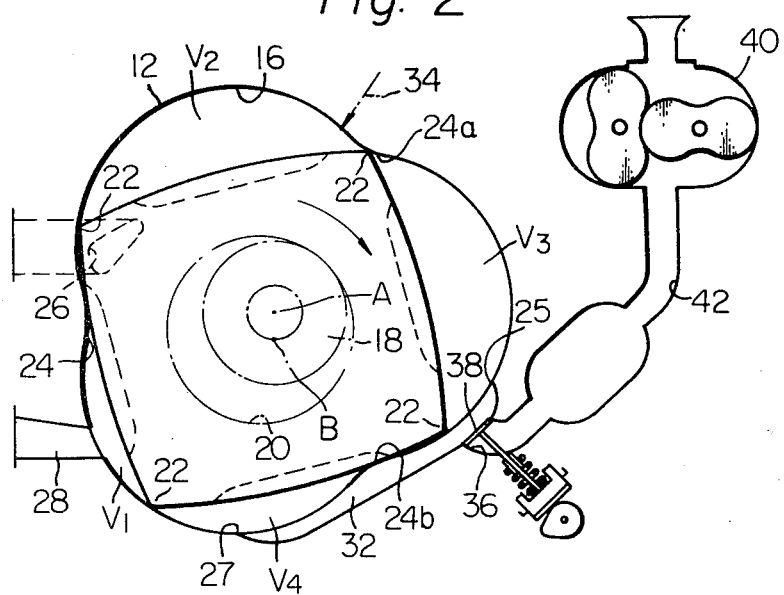
FIG. 2 is a sectional diagrammatic view illustrating a rotary engine operating in accordance with the angular relationship shown in FIGS. 1A–1L.

Referring also to FIG. 2, outer member 12 has its inner peripheral surface 16 shaped as a three-lobed epitrochoid and hence having three arched lobe-defining portions. Member 12 has a geometrical center generally designated A which can be considered the axis of the outer member, and encloses inner member 14 which is journalled on an eccentric 20 of a shaft 18. The geometric center or rotational axis of shaft 18 coincides with the geometric center A of outer member 12. The inner member 14 and the eccentric 20 have the same geometric center, generally designated B. Geometrical center B of the inner member 14 and the eccentric 20 is displaced from geometric center A and describes a circular path thereabout upon rotation of the inner member 14 on the eccentric 20. An externally toothed sun gear (not shown) concentric with the shaft 18 is fixed to the outer member 12 and is in toothed engagement with an internally-toothed ring gear or planet gear (not shown) for maintaining the inner member 14 in an initially properly indexed relation to the outer member 12 and to the shaft eccentric 20 at all times, the speed ratio between the inner member 14 and the shaft 18 being 1:4. The outer contour of the inner member 14 has four arched or curved sides and, as shown, has the form of square. Inner member 14 is provided with four apices 22 which are in continuous sliding contact with the inner peripheral surface 16 of outer member 12 and are provided with axis-parallel, radially movable sealing strips (not shown), one at each of the apices 22, for providing fluid-tight contact between the apices 22 and the inner peripheral surface 16, thereby dividing the space between the inner member and the inner portion of the outer member into four variable volume working chambers $V_1$, $V_2$, $V_3$ and $V_4$.

The inner peripheral surface 16 includes three ridges (or cusps) 24, 24a and 24b which are the closest points thereon to the geometrical center A of the outer member 12, and indicate minimum distance from the center A. Beyond the cusp 24, in the direction of rotation (indicated by a solid arrow) of inner member 14, that is, clockwise as viewed in FIGS. 1A–1L, there is provided through one end wall of the outer member 12 an intake port 26, and before the cusp 24 there is provided through the peripheral wall of the outer member 12, an exhaust port 28. A recess or cut-out portion 32 of suitable shape is arranged and provided at cusp 24b in outer member 12 inwardly of the peripheral surface 16 thereof. Recess 32 defines a transfer passage for purposes to be hereinafter further explained.

A complete operation or working cycle of one chamber $V_1$ will now be described, and it is to be understood that each chamber $V_1$, $V_2$, $V_3$ and $V_4$ follows the exact same operational cycle in the cyclic sequential order $V_1$, $V_4$, $V_3$ and $V_2$.

In FIG. 1A, the first or intake phase is commencing for chamber $V_1$. The volume of chamber $V_1$ increases in the successive operational positions as shown in FIGS. 1A–1L and can be considered to perform the first phase of the seven phase operation of the engine. It will be assumed for the purposes of present discussion that a charge of a fuel-air mixture as a first combustion medium, is drawn into chamber $V_1$ through intake port 26. More precisely, the intake phase commences when the leading apex uncovers intake port 26 and ends when the trailing apex covers the intake port 26.

Figure 1C:
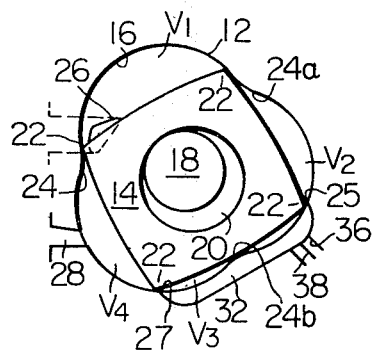
Figure 1D:
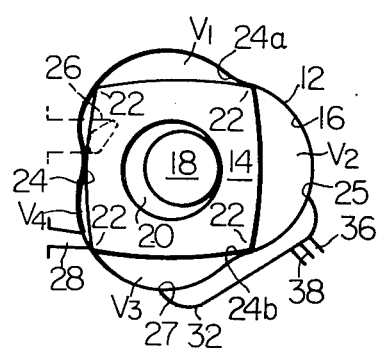
Figure 1E:
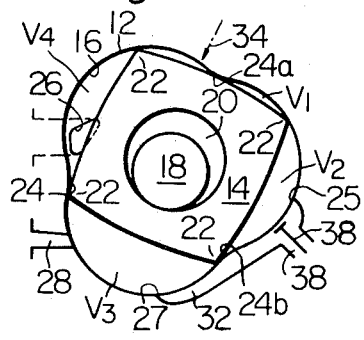

Chamber $V_1$ performs the second or compression-ignition phase as the inner member 14 rotates clockwise, as viewed in the drawings, in the successive operational positions as shown in FIGS. 1C–1E, and fuel-air mixture content is compressed. As soon as inner member 14 reaches the operational position as shown in FIG. 1E the compressed content of chamber $V_1$ (in the operative position of FIG. 1E) is ignited. To provide for spark-fired ignition of the mixture, a spark plug, diagrammatically indicated by arrow 34, may be provided. The spark plug 34 is located to pass through the wall of outer member 12 into communication with chamber $V_1$ (in the illustrated position of FIG. 1E), preferably in close proximity to and shortly before, in the direction of rotation of inner member 14, said minimum distance point or cusp 24a. Spark-fired ignition in the cycle being described, takes place in this second phase of chamber $V_1$. The compression-ignition phase commences when the leading apex passes cusp 24a and ends when the lobe center passes the cusp 24a.

Figure 1F:
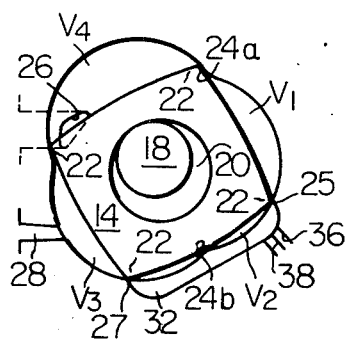

The third or power or primary expansion phase for chamber $V_1$ now commences. This expansion of chamber $V_1$ continuous until chamber $V_1$ occupies the position as shown in FIG. 1F. Work is done by this expansion. More specifically power phase commences when the lobe center passes cusp 24a and ends when the trailing apex passes the cusp 24a.

Figure 1G:
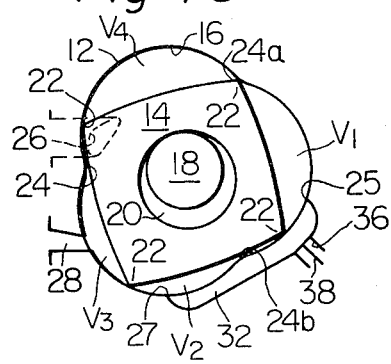
Figure 1H:
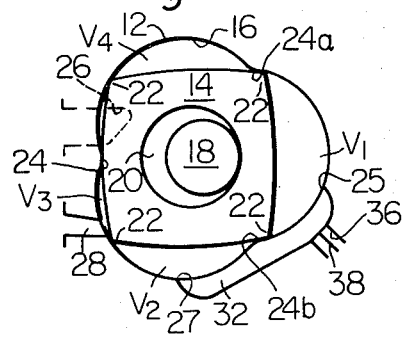

Shortly after chamber $V_1$ reaches the position as shown in FIG. 1F, chamber $V_1$ communicates with the next preceding working chamber $V_2$ by transfer passage 32, and now the fourth or transfer phase commences. The transfer phase commences when the leading apex passes the end 25 of transfer passage 32 and ends when the leading apex of the preceding chamber uncovers exhaust port 28. FIGS. 1G and 1H show a simultaneous increase in the volume of chambers $V_1$ and $V_2$ which are in communication with one another by means of the transfer passage 32. The transfer passage 32 is in the form of a recess provided in inner peripheral wall 16 of outer body 12. During this simultaneous increase in volume of chambers $V_1$ and $V_2$ burn gases in chamber $V_1$ are allowed into transfer passage 32 and chamber $V_2$ to mix with a charge of scavenging air in chamber $V_2$ and transfer passage 32. Thus, unburnt components in burn gases including hydrocarbons (HC) and carbon monoxide (CO) will be oxidized during this combustion of the burnt gases with charge of scavenging air or secondary air in chamber $V_2$ and transfer passage 32. When the combined volume of two chambers $V_1$ and $V_2$ has reached a maximum value, FIG. 1I, exhaust channel or port 28 is open to chamber $V_2$. The end of the fourth phase is completed for chamber $V_1$ when the rotor takes a position (not shown) shortly before the position for chamber $V_1$ shown in FIG. 1I. It will be noted that additional work is done by the combustion and expansion of burn gases during this fourth phase.

Figure 1I:
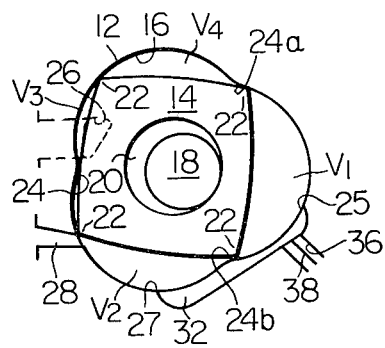
Figure 1J:
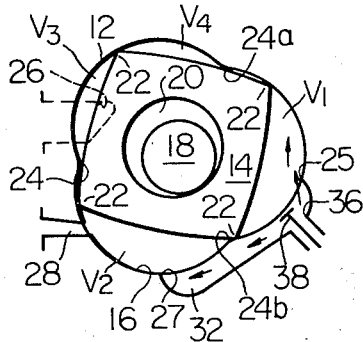
Figure 1K:
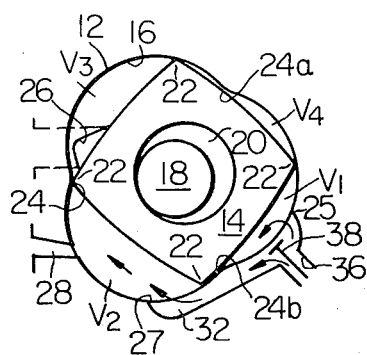
Figure 1L:
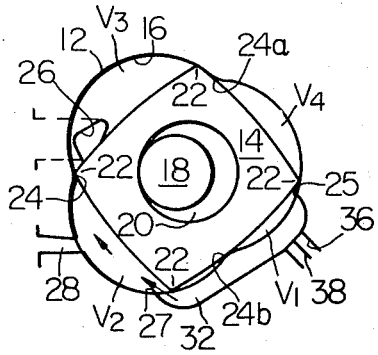

Shortly after exhaust port 28 is open to the next preceding chamber $V_2$, FIG. 1I, the fifth or scavenging phase for chamber $V_1$ commences. The scavenging phase commences when leading apex of the preceding chamber $V_3$ uncovers exhaust port 28 and the leading apex of chamber $V_1$ passes end 27 of transfer passage 32. For this phase a scavenging air intake port 36 is provided to supply a scavenging air under pressure or supercharged into chamber $V_1$ to scavenge and deliver burnt gases therein to preceding chamber $V_2$. The scavenging air port 36 is provided in the inner peripheral wall 16 of the outer body 12 in transfer passage 32 in the form of the present invention illustrated in FIGS. 1A–1L and FIG. 2. In this case a cam operated poppet valve 38 is provided to control the port opening period of scavenging air intake port 36. FIGS. 1J and 1L show that valve 38 is opened to permit scavenging air to be delivered through port 36 into chambers $V_1$ and $V_2$ by a pump or supercharger 40 (see FIG. 2).

The sixth or afterburning or secondary expansion phase commences when trailing apex passes point 25 and ends when leading apex uncovers exhaust port 28. When chamber $V_1$ reaches the position shown in FIG. 1L in which communication between chambers $V_1$ and $V_2$ is about to be closed, scavenging air port 36 is closed. When chamber $V_1$ takes sequentially the $V_2$ positions of FIG. 1F, FIG. 1G and FIG. 1H, chamber $V_1$ communicates with the next following chamber $V_4$ (in $V_1$ positions of FIG. 1G and FIG. 1H), and the charge of residual scavenging air in chamber $V_1$ and transfer passage 32 is mixed with burnt gases allowed thereinto from the following chamber $V_4$.

When chamber $V_1$ takes the $V_2$ position of FIG. 1I, the sixth or exhaust phase for the chamber $V_1$ commences. The seventh or exhaust phase is completed for chamber $V_1$ when it takes the $V_4$ position of FIG. 1D, thereby completing the cycle for chamber $V_1$.

This same working cycle is performed individually by each of the chambers $V_1$, $V_4$, $V_3$ and $V_2$ in that order.

In the above explanation of the seven phase cycle, it was assumed that a charge of stoichiometric fuel-air mixture was drawn in through the single intake port 26. It is to be understood as being within the scope of the present invention to draw or suck in an overrich fuel-air mixture and a lean fuel-air mixture through two separated ports (not shown) subdivided from the single intake port 26.

Referring now particularly to FIG. 2 of the drawings, this illustrates a sectional view of that rotary internal combustion engine which is diagrammatically illustrated through FIGS. 1A–1L. Cam actuating mechanism (not shown) for the cam operated poppet valve 38 provides scavenging port 36 opening period and timing in accordance with the cycle of operation. The port 36 communicates with pump 40 by conduit 42.

In the engine illustrated in FIG. 2, scavenging air intake port 36 is disposed in inner peripheral wall 16 of the outer body 12, it may be disposed in an end wall of the outer body 12 if desired as will be described hereinafter with reference to FIGS. 3 and 4.

Figure 3:
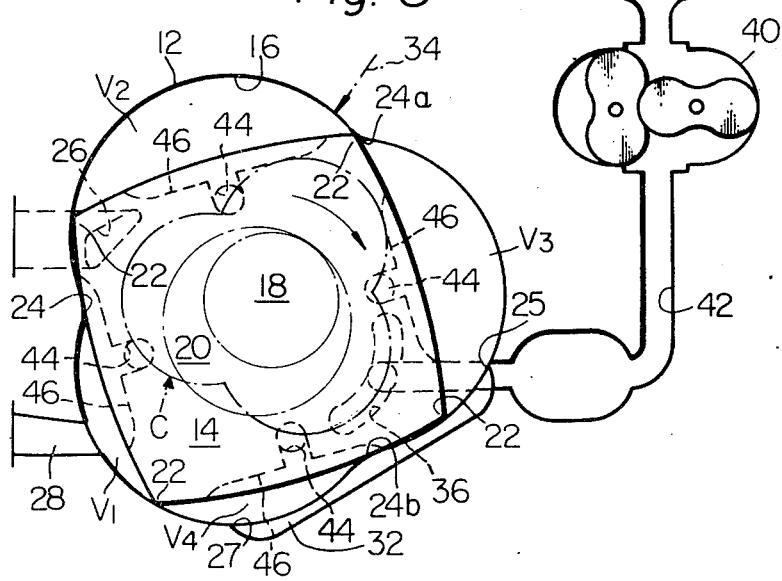
FIG. 3 is similar to FIG. 2 and illustrates another embodiment of a rotary engine.
Figure 4:
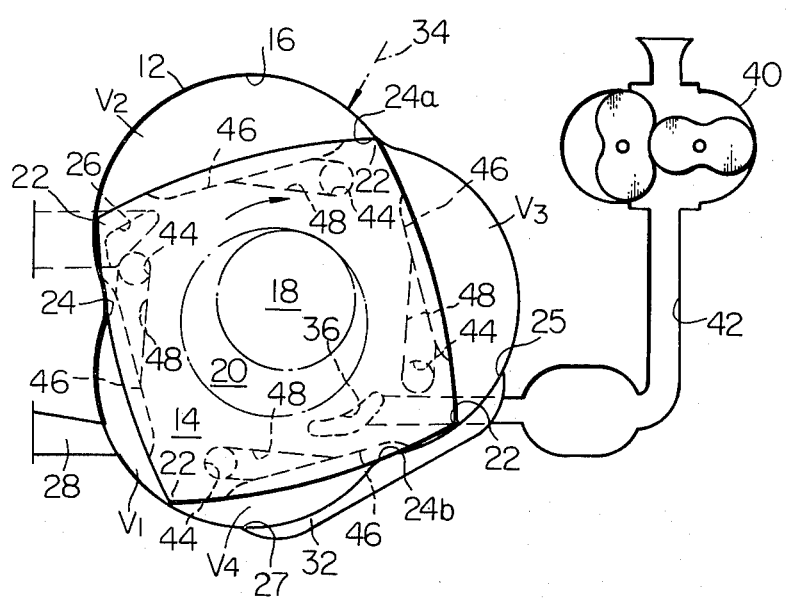
FIG. 4 is similar to FIG. 3 and illustrates still another embodiment of a rotary engine.

Referring to FIGS. 3 and 4 another two embodiments of rotary internal combustion engine operable in accordance with the working cycle having seven phases described above. In each of these embodiments scavenging air intake port 36 communicating with a pump 40 (engine driven) by conduit 42 is disposed in an area of an end wall that is continuously covered by the inner member 14 and that is adjacent to a chamber which is performing the fifth phase or scavenging phase (see the $V_1$ position of FIG. 1J).

Communication of scavenging air intake port 36 with chamber performing the fifth phase is established by providing the inner member 14 with a plurality of mating ports 44 in at least one end face, each of the mating ports 44 being open to the adjacent working face (no numeral) at a position within a recess 46 formed in each working face of the inner member 14. Mating port 44 may be of any desired outline.

Referring particularly to FIG. 3 phantom line C shows a path of mating ports 44 upon rotation of inner member 14 relative to the outer member 12 and it will be noted that scavenging air intake port 36 extends along the phantom line C through a certain length. The port opening period and timing of scavenging air intake port 36 can be determined by the proper selection of its length and its proper location relative to the mating ports 44.

Referring particularly to FIG. 4 the outline of scavenging air intake port 36 is different from that in the embodiment illustrated in FIG. 3. But the same principle with regards to relationship between scavenging air intake port 36 and mating port 44 applies to the both embodiments illustrated in FIGS. 3 and 4. In the engine illustrated in FIG. 4 the scavenging air will be directed to the trailing end portion of chamber performing the fifth phase because of the inclination of passages 48 in the direction of rotation of the inner member, thereby effecting efficient scavenging of burnt gases.

It will be appreciated from the comparison of the engines illustrated in FIGS. 3 and 4 with the engine illustrated in FIG. 2 that cam actuated poppet valve 36 and the associated cam actuating mechanism have been eliminated in the engines illustrated in FIGS. 3 and 4.

It will be appreciated from the aforesaid description with reference to a method of operating rotary internal combustion engine and to three embodiments of a rotary internal combustion engine operating on a seven phase working cycle in accordance with the method of the present invention that unburnt content in burnt gases is combusted during the fourth phase with the aid of scavenging air previously charged to the next preceding chamber and in the transfer passage and also in the fifth phase oxidized by fresh charge of scavenging air, thereby providing additional work by expansion during the sixth phase and considerable reduction of concentrations of toxic contents including hydrocarbon (HC) and carbon monoxide (CO).

It is obvious that many mnior modifications in the details in constructing a rotary engine of the present invention may be made without departing from the basic principles of the present invention.

While there has been described what is at present considered to be preferred embodiments of the present invention, it is apparent that many changes and modifications may be made therein without departing from the present invention, and it is, therefore intended in the accompanying claims to cover all such changes and modifications as fall within the true spirit and scope of the present invention.

What is claimed is:

1. In a seven phase rotary internal combustion engine comprising an outer stationary body; an inner body, said inner body being rotatable with respect to said outer body; said outer body including axially spaced end walls and a peripheral wall interconnecting the end walls, said peripheral wall including on the inner surface thereof three symmetrically arranged circumferentially spaced lobedefining portions, said inner body having its geometric center eccentrically displaced relative to the geometric center of said outer body and including on the outer peripheral surface thereof four symmetrically arranged circumferentially spaced apex portions, said inner surface of said peripheral wall and said outer peripheral surface being cooperatively shaped and operatively associated to define upon relative rotation of said inner body with respect to said outer body four variable volume working chambers; a first intake port means operatively associated with said outer body shortly beyond a point thereon spaced at a minimum distance from the center of said outer body in the direction of rotation of said inner body with respect to said outer body; an exhaust port means shortly before said point; a second intake port means in the vicinity of a third point thereon spaced at a minimum distance from the center of said outer body in the direction of rotation of said inner body with respect to said outer body; a transfer passage means positioned at a third point thereon spaced at a minimum distance from the center of said outer body in the direction of rotation of said inner body with respect to said outer body for placing one chamber of the engine into fluid communication with a second chamber which is next preceding in said direction of rotation once during each operational cycle of each chamber to transfer a portion of expanding combusting fuel-air mixture from said one chamber to said second chamber and for placing said one chamber in communication with a third chamber which is next following in said direction of rotation once during each operational cycle of each chamber to transfer the combustion product from said third chamber to said one chamber, a source of scavenging air communicating with said second intake port means; and ignition means operatively associated with said outer body and arranged to successively communicate with each chamber, said ignition means being positioned shortly before a second point thereon spaced at a minimum distance from the center of said outer body in the direction of rotation of said inner body with respect to said outer body; the improvement in which said second intake port means is disposed in an area of one of said end walls that is continuously covered by said inner body, said inner body having four mating ports in one end face adjacent to said one end wall and four passages therein establishing communication between said mating ports and the adjacent chambers, respectively, each of said mating ports being so disposed in said end face that it communicates with said second intake port once during each operational cycle of one of said adjacent chambers.

2. An engine as claimed in claim 1, in which each of said passages is angled in said inner body to direct scavenging air toward the trailing corner portion of said adjacent one chamber in the direction of rotation of said inner body with respect to said outer body.

* * * * *